United States Patent [19]

Bellot et al.

[11] 4,289,195

[45] Sep. 15, 1981

[54] CLIMATE CONTROL DEVICE FOR THE PASSENGER COMPARTMENT OF MOTOR VEHICLE

[75] Inventors: Dominique Bellot, Rueil; Alain Cohenca, Meudon, both of France

[73] Assignee: Regie National des Usines Renault, Boulogne-Billancourt, France

[21] Appl. No.: 73,293

[22] Filed: Sep. 7, 1979

[30] Foreign Application Priority Data

Sep. 29, 1978 [FR] France ................................ 78 27998

[51] Int. Cl.³ ............................................ F25B 29/00
[52] U.S. Cl. ........................................ 165/12; 165/16; 165/28; 165/30; 165/42; 236/91 F; 236/91 G; 237/12.3 A
[58] Field of Search ................. 237/12.3 A; 236/91 F, 236/91 G; 165/12, 23, 27, 28, 30, 42, 43, 44, 16

[56] References Cited

U.S. PATENT DOCUMENTS

| | | | |
|---|---|---|---|
| 3,181,791 | 5/1965 | Axelrod | 236/44 |
| 3,263,739 | 8/1966 | Gaskill et al. | 165/23 |
| 3,315,730 | 4/1967 | Weaver et al. | 165/23 |
| 3,406,904 | 10/1968 | Muzzi et al. | 237/2 |
| 3,428,115 | 2/1969 | Caldwell | 165/23 |
| 3,838,810 | 10/1974 | McMann et al. | 236/9 R |

FOREIGN PATENT DOCUMENTS

| | | |
|---|---|---|
| 2621663 | 12/1977 | Fed. Rep. of Germany . |
| 1295268 | 10/1962 | France . |
| 1482752 | 5/1967 | France . |
| 2018468 | 5/1970 | France . |
| 2131025 | 11/1972 | France . |
| 2150294 | 4/1973 | France . |
| 2178649 | 11/1973 | France . |
| 2244641 | 4/1975 | France . |
| 2247680 | 5/1975 | France . |
| 2270633 | 12/1975 | France . |
| 2317116 | 2/1977 | France . |
| 2329196 | 5/1977 | France . |
| 2354014 | 12/1977 | France . |
| 2368747 | 5/1978 | France . |
| 1278202 | 6/1972 | United Kingdom . |
| 1423043 | 1/1976 | United Kingdom . |

OTHER PUBLICATIONS

IBM Technical Disclosure Bulletin–vol. 20, Oct. 1977, "Facility Control and Power Management System", by W. J. Fant and M. J. Shan, pp. 1964, 1965, New York.

Primary Examiner—Albert W. Davis
Assistant Examiner—Margaret A. Focarino
Attorney, Agent, or Firm—Oblon, Fisher, Spivak, McClelland & Maier

[57] ABSTRACT

A device for the climate control of the passenger compartment of an automobile, including an electric fan group, an air distribution conduit in the passenger compartment which has at its entrance an air mixing shutter for diverting a variable amount of the air flow from the fan to a heating radiator, followed by a distribution shutter which sends air either to a defrosting conduit or to an conduit with outlets at the floor of the passenger compartment, electronic probes for measuring the temperature inside and outside the passenger compartment and which are connected to a microcalculator whose memory contains a formula for the interior temperature ordered as well as a law for determining flow from the fan group, both as a function of the outside temperature, the calculator being programmed for receiving temperature measurement data and processing them so as to give off output signals which depend on the temperature ordered and the measured interior temperature, signals to which respond devices for adjusting the position of the micromotors controlling the mixing and distribution shutters mentioned above, as well as means of sending command to supply the heating radiator and signals commanding an electrical supply to the fan group in accordance with the flow formula referred to above.

12 Claims, 29 Drawing Figures

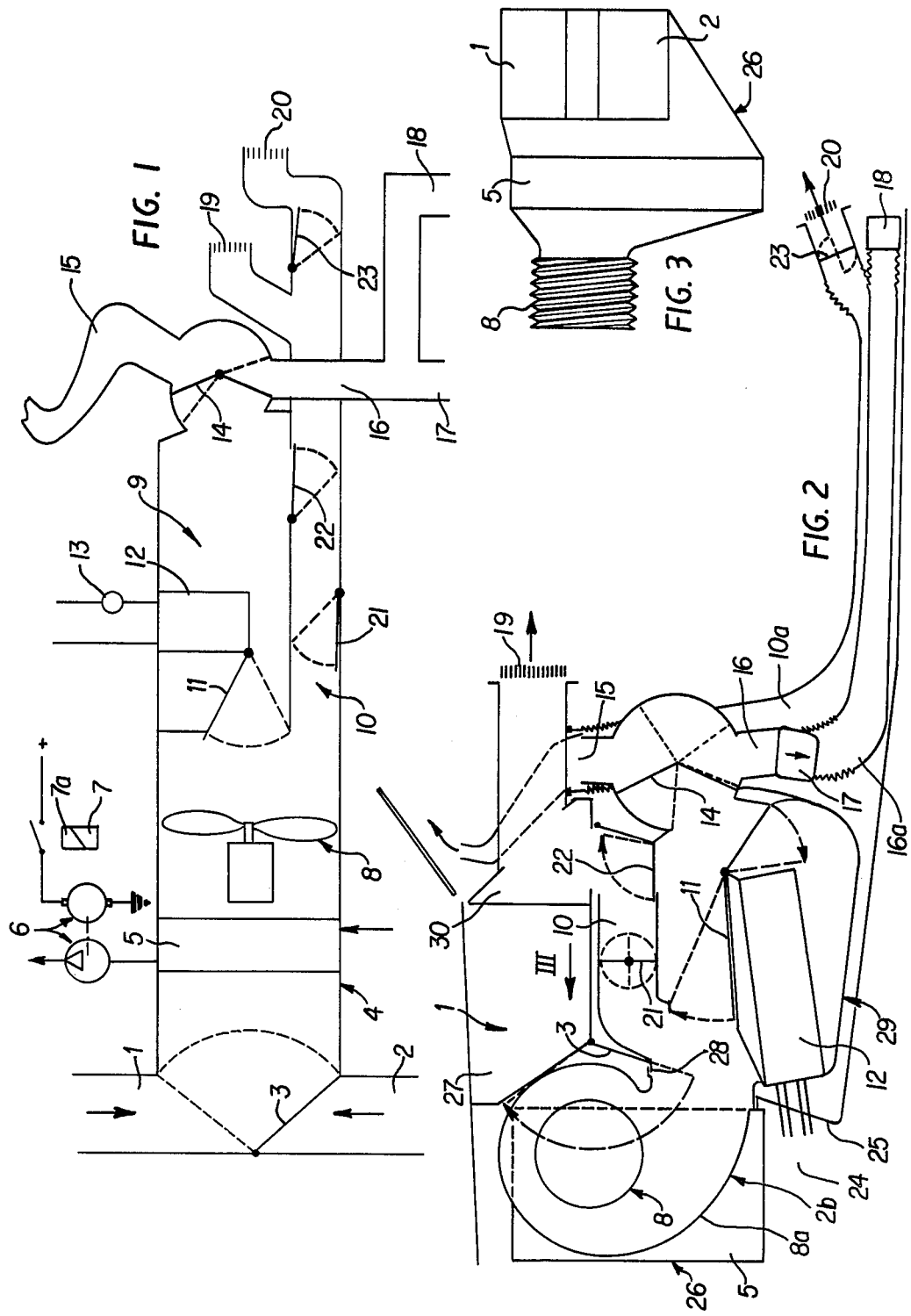

CLIMATE CONTROL DEVICE FOR THE PASSENGER COMPARTMENT OF MOTOR VEHICLE

BACKGROUND OF THE INVENTION

Field of the Invention

The invention relates to a climate control device for the passenger compartment of a motor vehicle, used at least for heating purposes but also suitable for use in combination with a refrigeration system in order to provide comfortable interior air temperatures within a wide range of temperatures outside the vehicle.

The invention also concerns a particular use of such a climate control device with automatic control.

Essentially, to that end, the automobile passenger compartment climate control device according to the invention, consisting of an electric fan group, an air distribution conduit in the passenger compartment which has at its entrance an air mixing shutter which diverts a variable amount of the air flow from the fan to a heating radiator, followed by a distribution shutter which sends air to either a defrosting conduit or to an outlet at the floor of the passenger compartment, is characterized by the fact that it includes electronic probes for measuring the temperature inside and outside the passenger compartment which are connected to a microcalculator whose memory contains a formula for the interior temperature ordered and a law or control for the flow from the fan group, both as a function of the outside temperature, the calculator being programmed for receiving temperature measurement data and processing it so as to give off signals which depend on the temperature ordered and the measured interior temperature, signals to which devices for adjusting the position of the micromotors controlling the mixing and distribution shutters mentioned above respond as well as means for sending commands to feed the heating radiator and signals commanding the electrical supply to the fan group in accordance with the flow formula referred to above.

In addition, it is to be preferred that the device according to the invention have, in parallel to said distribution conduit, an auxiliary conduit leading to inside air vents, characterized by the fact that said auxiliary conduit entails a flow regulating shutter and a shutter for mixing with heated air from the aforementioned distribution conduit, and methods for controlling micromotors which activate the aforementioned shutters in the auxiliary circuit in accordance with output signals obtained by comparison between the inside temperature formula ordered and the measured temperature.

This device may also be used in conjunction with a refrigeration unit, in which case it is particularly characterized by the fact that said unit is located in the circuit prior to the fan unit in an air entry conduit connected to the distribution conduit and at its entry entailing a two-position shutter: recycling of passenger compartment air or allowing the entry of outside air.

More particularly, it is characterized by the fact that, in response to a predetermined threshhold of outside air temperature measured by the relevant probe, the microcalculator issues a signal for the refrigeration unit to begin functioning, and, in response to a second predetermined and higher temperature threshhold, a signal to position the above-metioned shutter in the recycling position.

The invention thus relates to various ways to affect the determination of the temperature inside the passenger compartment as well as to ways of selecting and correcting various modes of operation at the demand of the user, as will be seen below.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a synoptic schematic illustrating the various circuits of the climate control device;

FIG. 2 is a schematic view of the illustration of the device in a motor vehicle;

FIG. 3 is a detail view taken in the direction of arrow III of FIG. 2 of the refrigeration unit as it ties into the fan unit;

DETAILED DESCRIPTION OF THE PREFERRED EMBODIMENTS

Figure 4:
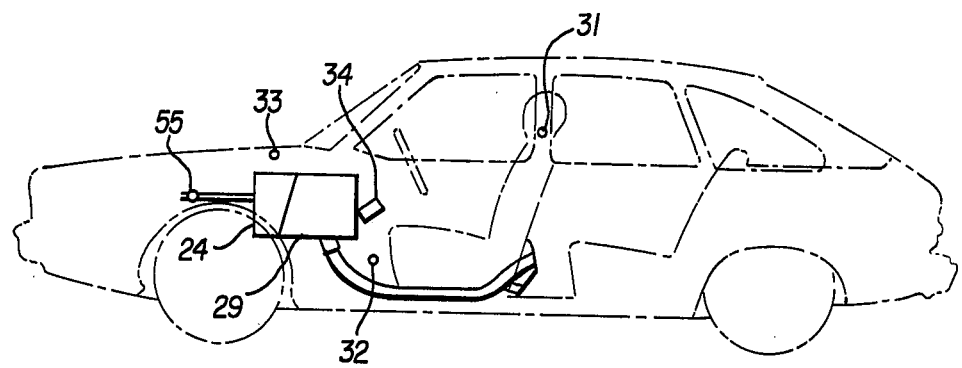
FIG. 4 is a general view of a vehicle illustrating the installation of the climate control device and various parts of it in the vehicle.

Following the synoptic schematic of FIG. 1, the air distribution circuit of the climate control device in question includes at the entrance an intake conduit 1 for outside air and a recycling conduit 2 (designed to be connected to the passenger compartment of the vehicle) as well as a shutter 3 with two positions which connects one or the other conduit 1 or 2 with an air admission conduit 4. The latter incorporates an evaporator 5 from a standard refrigeration circuit represented schematically here simply by its compressor 6, the operation of which depends on an electrical contact 7a from a command relay 7. Upstream from the evaporator 5 is arranged an electronic fan group 8, followed by several air conduits leading toward the passenger compartment, including here in parallel two distribution conduits such as denoted by reference numeral 9, one for the left and one for the right side of the vehicle, and an auxiliary conduit 10.

Each distribution conduit 9 has a mixing shutter 11 at its entrance which serves to draw off, according to its position, a variable quantity of the flow of air over a heating radiator 12 which is common to the two conduits 9 on the right and left side. This radiator 12 is in this case supplied by the engine cooling water circuit of the vehicle (not shown) through the intermediary of an electromagnetic gate 13 which allows or prevents circulation of hot water in the radiator.

In each distribution conduit 9 the mixing shutter 11 is followed by a distribution shutter 14 which directs air between a defrosting conduit 15 reaching at least the bottom of the vehicle windshield if not the side windows associated with it, and a conduit 16 for venting to the floor of the vehicle entailing forward 17 and rear 18 vents at passenger foot level.

The auxiliary conduit 10 leads to six outlets, four in the front as depicted by reference numeral 19 and two in the rear denoted by reference numeral 20, includes a flow regulation shutter 21 and a mixing shutter 22 for mixing with the warm air taken simultaneously from the left and right side conduits 9, as well as a shutter 23 for isolating the rear outlets 20. The two shutters 11 and shutter 21 are variable position shutters which can be commanded by step-by-step type electric micromotors as will be shown below. The other shutters are all two-position shutters with the exception of the distribution shutters 14, which are three-position, and can be commanded by electric micromotors as will be shown below.

FIGS. 2 and 3 illustrate the installation of such a device in a vehicle and use the same reference numbers as those in FIG. 1 for the components. These Figures reveal that in the forward compartment of the vehicle, in front of the firewall 25, is mounted a container 26 which houses the evaporator 5 of the refrigeration circuit and the casing 8a for the fan group 8, as well as the shutter 3. The intake of outside air is ensured by a hollow transversal beam 27. The casing 8a of the fan group 8 is connected at the level of the firewall 25 with the opening 28 of a housing 29 on the passenger compartment side wich contains the heating radiator 12 while being partitioned off, lined up and equipped with shutters 11, 14, 21 and 22 so as to complete the circuits corresponding to those shown in FIG. 1.

The rear outlet conduits to the floor 16a are flexible conduits attached to the housing in the same way as the flexible conduits 10a for feeding air to the rear left and right side vents connected to the corresponding forward vents 19, attached on a hollow transversal beam 30 into which is routed auxiliary conduit 10.

Figure 5:
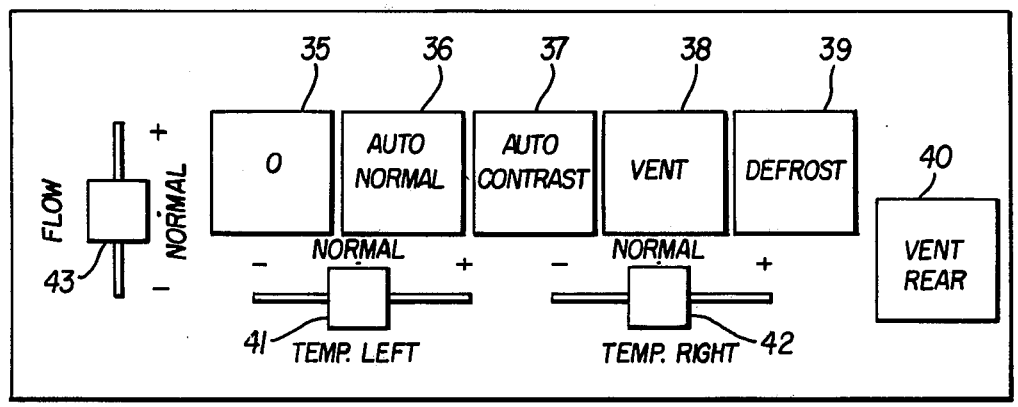
FIG. 5 is a frontal view of a command panel for the device.

The automatic regulation of such a climate control device calls for various units installed as in FIG. 4, including, in the passenger compartment on the left and right sides, an electronic probe 31 for temperature measurement placed at a high level, at head rest level, and an electronic probe 32 for temperature measurement placed at a low level, at the foot level of the driver and front seat passenger. Outside the passenger compartment, here in the hollow transversal beam 27, there is an electronic probe 33 for measuring the outside temperature. Also, shown is a control panel 34 within reach of the driver, which is the subject of FIG. 5, showing its components as follows:

a button 35 marked "O" corresponding to the OFF position of the device;

a button 36 marked AUTO-NORMAL corresponding to the ordinary automatic operation which will be described below;

a button 37 marked AUTO-CONTRAST corresponding to a type of automatic functioning which is different from the one mentioned above;

a button 38 marked VENT corresponding to the operation specifically for ventilation purposes;

a button 39 marked DEFROST corresponding to special operation for demisting and defrosting of the windshield as perhaps the side windows;

a button 40 marked VENT-REAR corresponding to operation with flow from the rear vents (an additional button for the same function is also provided in the rear of the vehicle within reach of the passengers);

two sliding controls 41, 42 for correcting the temperature level for the left and right sides of the vehicle, respectively, allowing override of the temperature imposed in the automatic mode;

and one sliding control 43 for correcting the flow from the fan group 8 imposed in the automatic mode.

Figure 6:
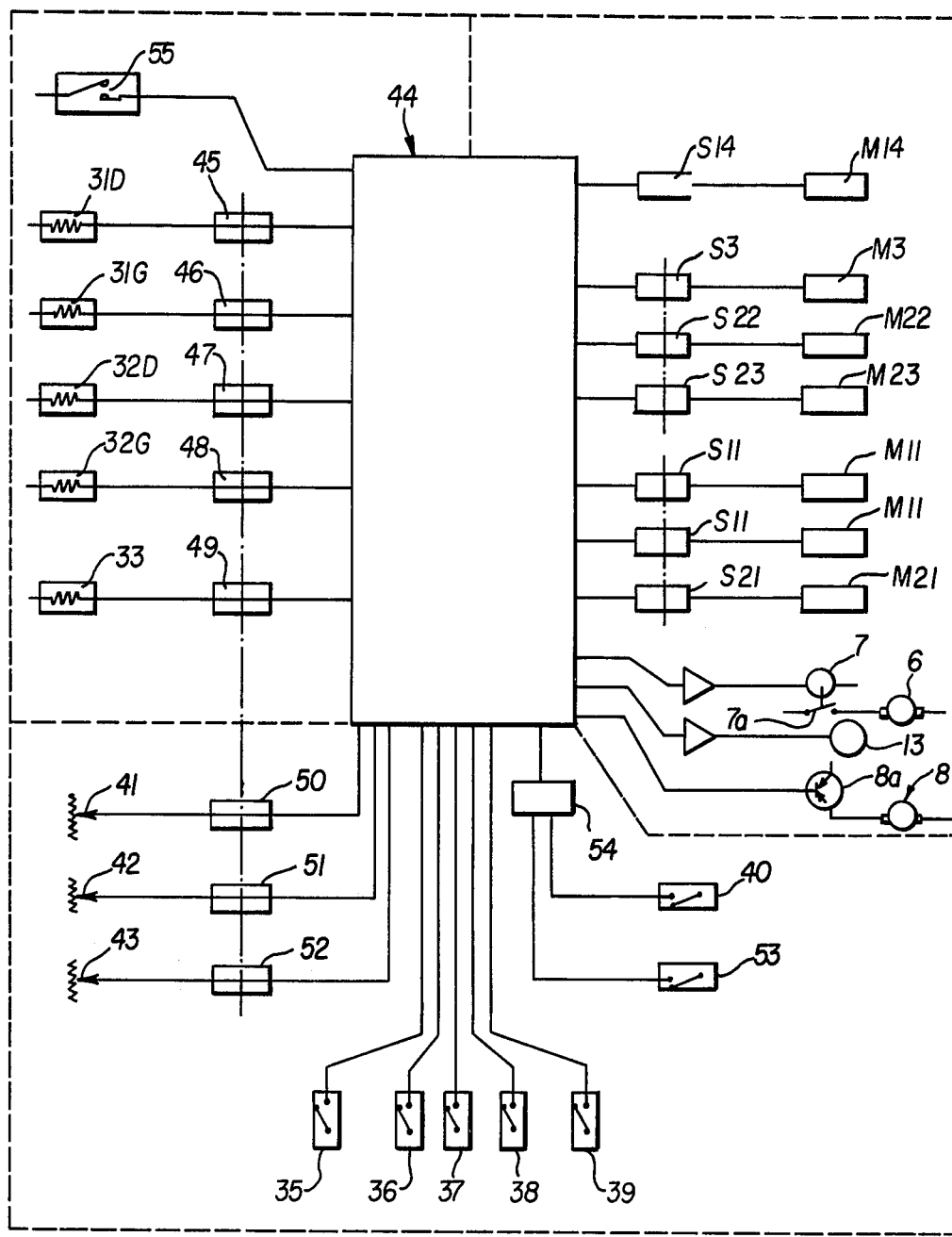
FIG. 6 is a schematic overall view of the command circuits, measurement circuits, and motor activation circuits connected to the regulating microcalculator.

The probes and command or correction units above are connected, as represented schematically in FIG. 6, to a microcalculator 44, the output wires of which are tied into circuits feeding the micromotors commanding the shutters mentioned earlier, to the command circuits for the fan group 8, the electromagnetic shutter 13 for feed of the heating radiator, and relay 7 for stopping and starting the compressor 6 of the refrigeration circuit.

The step-by-step micromotors commanding the two shutters 11 and shutter 21 are designated by reference numerals M11 and M21, respectively, and the corresponding feed circuits by reference numerals S11 and S21 (described below). The command micromotors for the two-position shutters 3, 22 and 33 are designated M3, M22, M23 respectively, and the corresponding circuits by S3, S22 and S23 (described later).

The common command micromotor for the two distribution shutters 14, which have three positions, is designated by M14, and its corresponding control circuit is designated S14 (described below). The temperature probes, 31D and 31G for the right and left high-level probes and 32D and 32G for the right and left lower-level probes, and 33 for the outside probe, consist of thermal resistance circuits tied in, respectively, to the microcalculator through power-frequency converters 45 to 49.

The sliding controls for temperature correction on the right and left sides 41 and 42 and the sliding control 43 for correcting the flow of the fan group 8 are sliding potentiometer units tied in, respectively, to the microcalculator 44 through power-frequency converters 50 to 52. Buttons 35 to 39 are electrical contact switches with the closed position corresponding to depression of the button, and are tied in directly to the microcalculator 44. Only one button may be depressed at a time in accordance with known arrangements.

Button 40 and the supplementary button referred to above with the same function, designated by 53 in FIG. 6, are also electrical contact switches which close by depressing the button, and are tied into the two input points into circuit 54, described later, the output from which is tied into the microcalculator 44. In addition to the temperature measurement probes there is a thermocontact 55 which responds to the temperature of the engine coolant of the motor, closing when the temperature reaches at least 40° to 50° C., and which is also tied into the microcalculator 44 at an input point.

Figure 7:
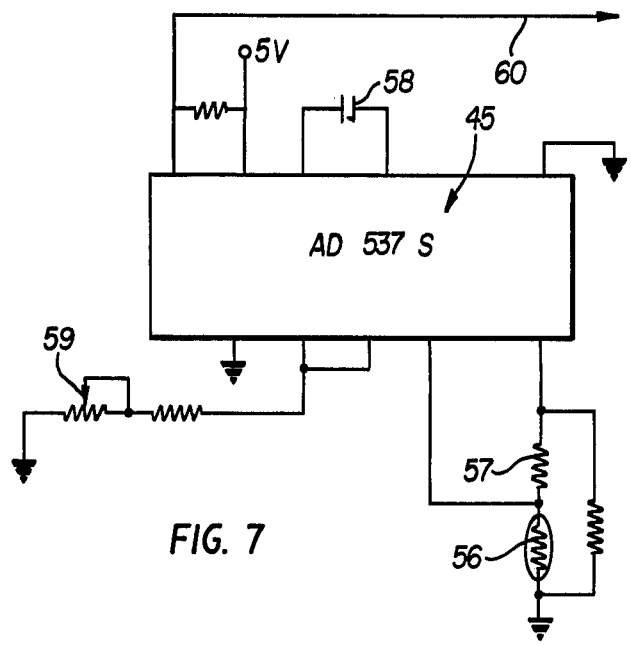
FIG. 7 is a schematic view of a temperature measurement circuit.

FIG. 7 represents a temperature probe circuit, with probe 31D taken as an example, which includes a thermal resistor 56 which forms, with resistor 57, a power divider of which one extremity and the midpoint respectively are tied into the two "power" input points of the corresponding power-frequency convertor 45. The latter in this instance is represented by an integrated circuit, such as the ANALOG DEVICES AD 537 S; the Figure shows the accessory positive feed and "mass" branchings, from a condenser 58 and from an adjusting potentiometer 59 such as for power ranges possible within the limits of probe 31D in the area of the outside temperature considered for climate control purposes (from −30° C. to +40° C., for example), with the output frequency collected by conductor 60 and applied to an input to the microcalculator 44 in a range from 0 to 100 Hertz.

Figure 8:
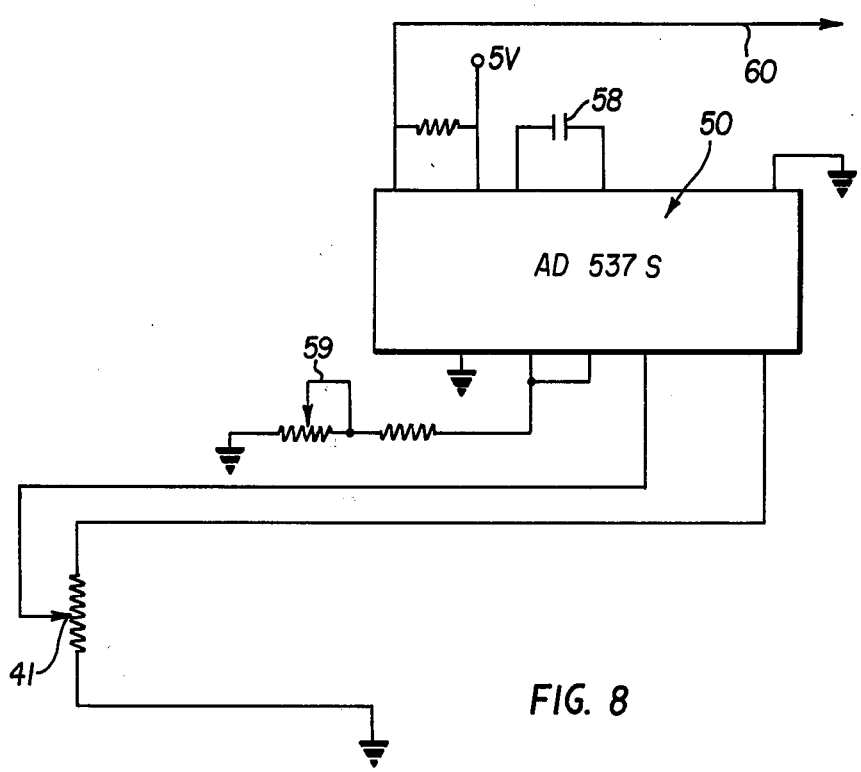
FIG. 8 is a schematic view of a temperature correction circuit.

FIG. 8 illustrates a potentiometer-type temperature correction circuit, that of the sliding control 41, for example, in which one end of the potentiometer and the cursor, respectively, are tied into the two "power" input points of the corresponding power-frequency converter 50, consisting as in the previous case of an integrated circuit such as the aforementioned AD 537 S, with accessory wiring analogous to the previous case but as a function of the variations in the position of the cursor, the output frequency falling somewhere within the band represented by the output frequency from the converters from the measurement probes. A circuit identical to the one in FIG. 8 is also used in the case of sliding control 43 for correcting the flow from the fan group 8.

Figure 9:
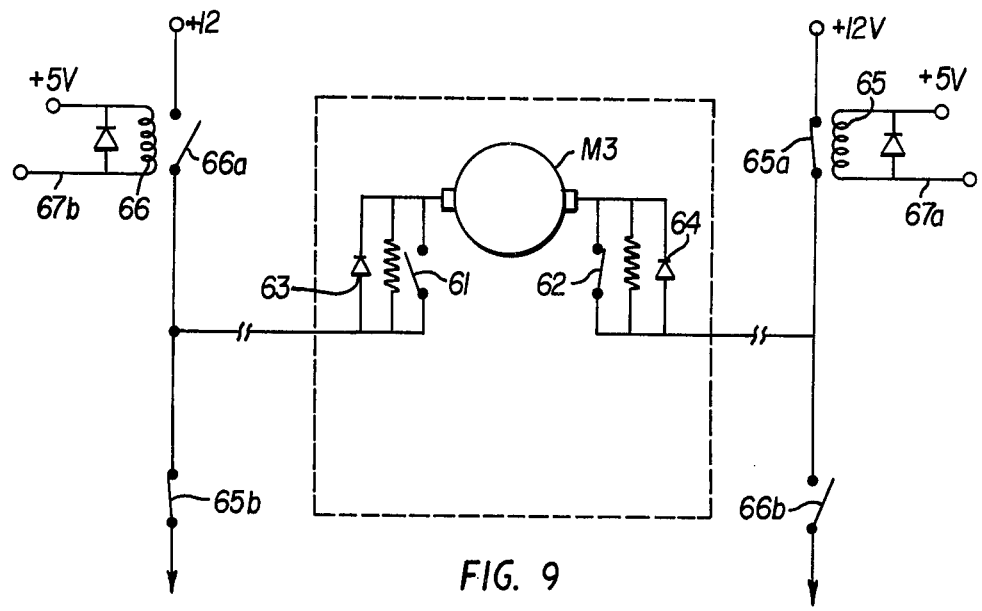
FIG. 9 is a schematic view of a control circuit for the micromotor activating a two-position shutter.

FIG. 9 represents a control circuit for the micromotor which commands a two-position shutter, such as the one for motor M3 which is designated S3 in FIG. 6. In this case motor M3, a direct current motor, is activated in one direction or the other by reversing the polarity of the feed, action being stopped at the end of the shutter's movement range by stops 61, 62, in parallel to which are diodes 63, 64 for selecting the passing direction of the current. A relay 65 with double contacts 65a, 65b is used for closing one source of feed of the motor M3 while a relay 66 with double contacts 66a, 66b is used to close another source of feed to the motor of opposite polarity. Thus when relay 65 is activated through conductor 67a tied into an output from the microprocessor 44 in the status of zero logic, contacts 65a and 65b are closed and motor M3 moves the shutter 3 which corresponds to one or the other of its end positions, thereby opening the breaker at the end of the movement pattern 61 (position in FIG. 9), whereas the other relay 66 is not activated as its feed conductor 67b is tied into a microcalculator output point in logical status 1, corresponding to a level of power equal to that of the positive power applied at the other side of the relay.

An inverse situation in the microcalculator outputs 44 which govern the activation of these relays causes inverse motion of the motor M3 and causes the shutter 3 to assume its other end position. These relays have a free wheel diode of conventional usage in parallel to their winding. Resistance at the extremities of the end of movement breakers 61, 62 makes it possible to maintain the shutter in the position considered under a small torque provided by the slight current maintained in the motor.

Figure 10:
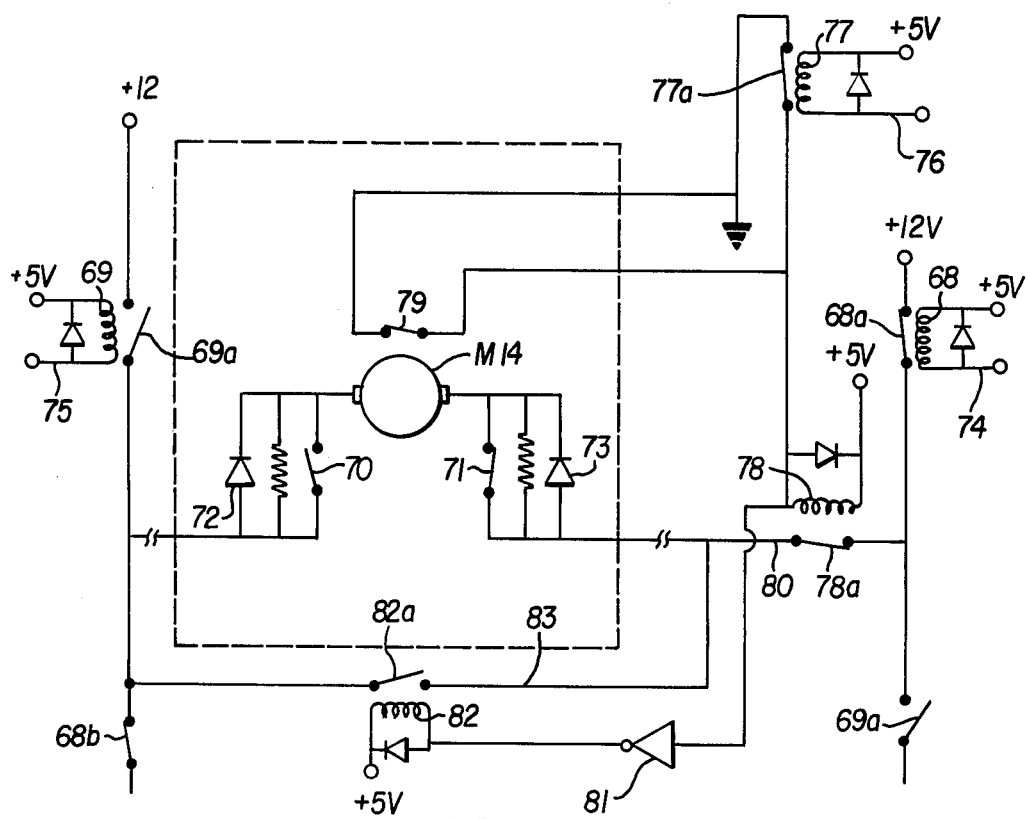
FIG. 10 is a schematic view of a control circuit for the micromotor activating a three-position shutter.

FIG. 10 represents the control circuit for the micromotor M14 which commands the three-position distribution shutter 14. Micromotor M14 is a direct current motor activated as described above in one direction or the other by reversing the feed polarity through one of the other of the two relays 68, 69 to double contacts 68a, 68b, 69a, 69b with the stoppage provided by breakers 70, 71 each brought into play at one end or the other of the range of movement of the shutter 14 and in parallel to which are the diodes 72, 73 for selecting the passing direction of the current.

Relays 68, 69 have their feed conductors 74, 75 connected as above to an output point of the microprocessor 44. At another of its output points is connected through container 76, a third command relay 77 whose contact 77a governs the current feed to an auxiliary relay 78, in parallel with a breaker 79 with an opening commanded at the middle position of the shutter 14. Relay 78 entails a contact 78a placed on a conductor 80 through which passes the feed current of the motor regardless of its direction.

At the negative end of the relay 78 is connected the opening of a reversing gate 81, the output of which is connected to the activating coil of a relay 82, which is, moreover, tied into a positive current feed source at its other end. This relay 82 entails a contact 82a placed on a conductor 83 for shorting out the motor armature.

Thus when the output of the microcalculator 44 to which relay 77 is attached through 76 is at the zero status, relay 77 is activated and, through its contact 77a which is then closed, relay 78 is also activated and its contact 78a is closed, while the input to the gate 81 is at a negative potential and its output is at positive potential so the relay 82 is not activated and its contact 82a remains open. Under these conditions, depending on whether one or the other of the two outputs from the microcalculator 44 to which relays 68 and 69 are connected through 74 and 75 is in the zero status, the relays corresponding to said output are activated and its contacts (68a, 68b or 69a, 69b) close, feeding the motor M14 with current travelling in one direction or the other in such a way that as in the preceding case, the subject of FIG. 9, the shutter 14 is drawn toward one of its extreme positions, for which reason the corresponding end position breaker 70 or 71 is opened.

When the output signal from the microcalculator 44 to which the relay 77 is connected is, to the contrary, in logic status 1, the relay 77 is deactivated and its contact 77a opened, but relay 78 remains activated through breaker 79, then closed because it opens only when the shutter 14 moves into the intermediate position. Furthermore, if the output from the microcalculator 44 connected to relays 68, 69 change to the logic status opposite to their original status, the motor M14 is then fed with current in the direction required to move the shutter 14 toward its other end position, but when the shutter 14 passes through the intermediate position, the opening of breaker 79 for detecting that position deactivates relay 78, and hence contact 78a opens and breaks the supply of electricity to the motor M14 and stops the shutter 14 in the middle position. To reliably ensure instantaneous stoppage, provision is made for the short-circuiting of the armature referred to above through the contact 82a of the relay 82, which is closed following the activation of this relay as a result of the deactivation of relay 78, which makes the input to gate 81 positive and its output negative, a necessary condition for activating relay 82. Thus, depending on the status of the three output points from the microcalculator 44 connected to relays 68, 69, and 77, the three positions of the shutter 14 activated by the motor M14 which have been defined above are obtained properly.

Figure 11:
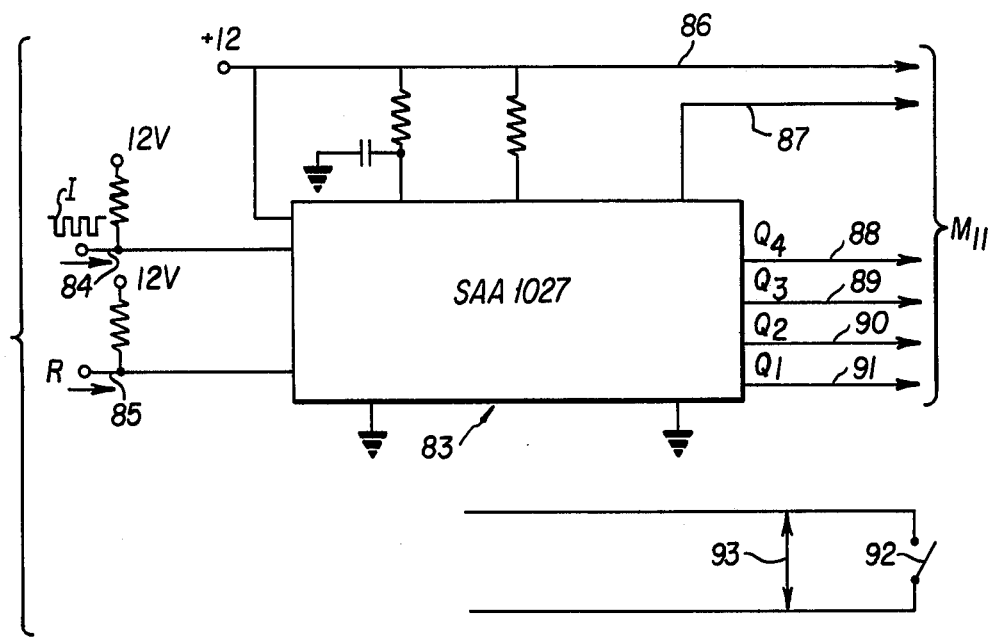
FIG. 11 is a schematic view of a control circuit for the micromotor which step-by-step activates a variable position shutter.

FIG. 11 represents a control circuit for one of the step-by-step micromotors for activating shutters 11 or 21, this example taking the case of micromotor M11 for activating one of the two shutters 11. This command is basically made up by means of an integrated circuit 83, such as the SAA 1027 from the R.T.C. Corporation, consisting of two inputs designed to be connected to two outputs from the microcalculator 44, one through a conductor 84 connected with an output source emitting command impulses I, the other through a conductor 85 connected with an output source emitting a signal with logic 1 or 0 defining the direction of rotation R of the motor. This circuit includes branches as indicated, with a feed conductor 86 of positive polarity, an output conductor 87, to which are associated four output conductors 88 to 91 with binary signals designed to be related to the corresponding limits of the step-by-step micromotor M11, which can thus be commanded rotation by rotation in a known manner in response to the command impulse I frequency, and the output shaft is connected to the shutter 11 to be activated through a reduction mechanism of a known type which greatly reduces rotation.

Figure 12:
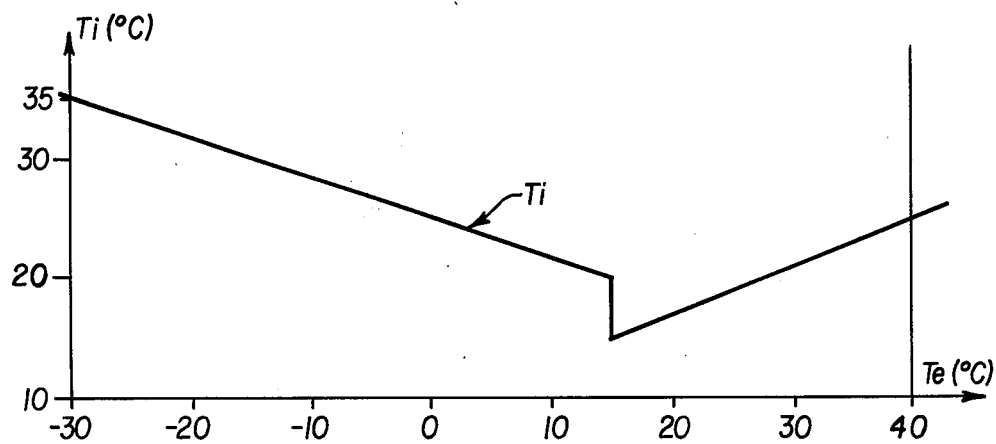
FIG. 12 is a diagram representing the formula for ordering the passenger compartment temperature as a function of the outside temperature.

A breaker 92 for indicating the closing of the corresponding shutter 11 is provided in a circuit 93 for resetting at zero by means of the motor M11, this breaker being activatable by a cam (not shown) on the axis of the shutter. When the microcalculator 44 acquires measurements and temperature corrections as described later, and has in its memory a law or control for ordering a given temperature for the interior of the passenger compartment Ti as a function of the exterior temperature Te, a formula, for example, in the form shown in FIG. 12 where the abscissa shows the exterior temperature Te in degrees Celsius and the ordinate the inside temperature of the passenger compartment Ti which corresponds, this law in this case having a break at an outside temperature of 15° C. which is the temperature below which the outside air is heated and above which the outside air is cooled.

The passenger compartment temperature measured is a combination calculated in the microcalculator of the mean temperature measured using the high probes 31D, 31G and tb measured using the low probes 32B and 32G and corresponding to the formula: Tm [mean temperature]=αth [high probe temperature]+(1−α)tb [low probe temperatures], in which α is a variable coefficient depending on whether or not the air is heated, chosen so as to give more weight to the measurement from the low probes tb in the case of air heating (below a measured outside temperature of 15° C.) and giving more weight, to the contrary, to the high probe temperatures [th] in the case of cooling the air (measured outside temperature about 15° C.).

In the device presently being described, the preferred differentiation in climate control from the left side to the right side of the passenger compartment, which may be permitted by using the potentiometric cursors 41 and 42 for correction, is limited simply to the case of heating of the air where such differentiation may be simply introduced by regulating the position of each of the mixing shutters 11.

This correction is introduced into the microcalculator 44 at temperatures below 15° C. measured exterior temperature, by combining with that outside measurement from probe 33, on the one hand, the measurement of correction desired as indicated by the position of sliding control 41, for the right side, before referring to the law Ti for ordering the temperature of the passenger compartment, this in order to command, by comparison with the measured and calculated temperature Tm referred to above, the variable position of the mixing shutter 11 for air distributed to the right side, and on the other hand the measurement of desired correction resulting from the position of the cursor in sliding control 42 for regulating in like manner, by means of the other shutter 11, the temperature of the left side of the vehicle, which amounts to the same thing as simulating by means of these correcting devices an outside temperature which differs from the real outside temperature before the temperature ordering law is referred to. The correctors can be provided in such a manner that they can have an impact of as much as 8° C. on the exterior temperature measured by probe 33.

Figure 13:
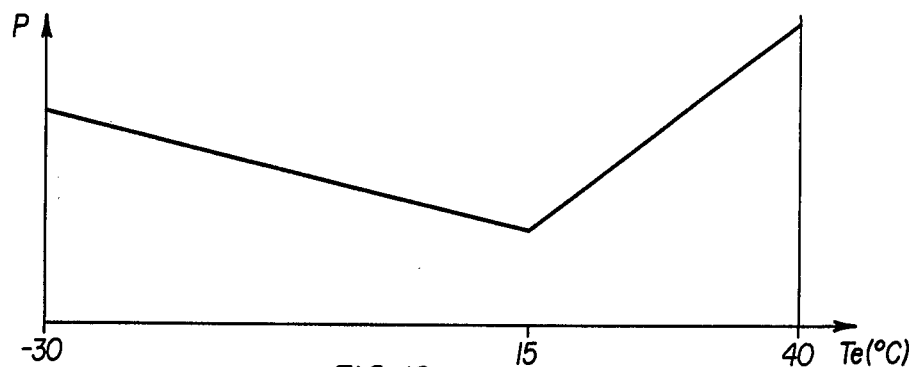
FIG. 13 is a diagram representing the law for ordering the flow or power of the fan group in the automatic climate control mode.

The microcalculator 44 also contains, recorded in its memory, a fan group 8 flow law, i.e., in this case the electrical supply for the motor of the group, a law for the operating modes referred to above as AUTO-NORMAL and AUTO-CONTRAST (buttons 36, 37), which is represented in FIG. 13 with the measured exterior temperature Te on the abscissa and the power P of the fan which comes into play on the ordinate, the maximum power corresponding to a Te temperature of 40° C. and the minimum to 15° C., the power being increased more during cooling than heating so as to promote in the latter case the temperature of the air blown into the car rather than its quantity.

Figure 14:
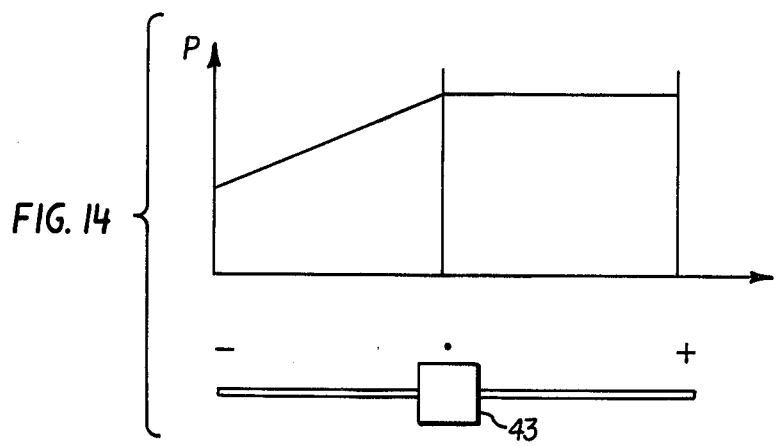
FIG. 14 is a diagram representing the law for ordering the flow or power of the fan group in the demisting-/defrosting mode.

It will be disclosed hereinbelow how this regulation of power is applied electrically to the fan group. For the operation of the DEFROST mode, another flow law for the fan group 8 is provided by the microcalculator 44 regardless of the temperature and as illustrated in FIG. 14, and depending on the amount of position change on the sliding control 43 for correction, represented on the abscissa, with the ordinate showing the power P of the fan group put into play, the latter being gradually reducible to about the halfway point in a range of manual correction which corresponds to operation at a reduced temperature solely for demisting purposes.

For operation in the VENTILATION mode, another flow law for the fan group 8 is provided by the microcalculator 44, which is independent of the temperature and depends only on the position of the sliding correction control 44, the central position of which corresponds to an order to feed half-power current to the fan group 8, with power increasing to its maximum at the stop in the direction of the + sign, and decreasing to one fourth of maximum power at the stop position in the direction of the − sign for movement of the cursor.

Figure 15:
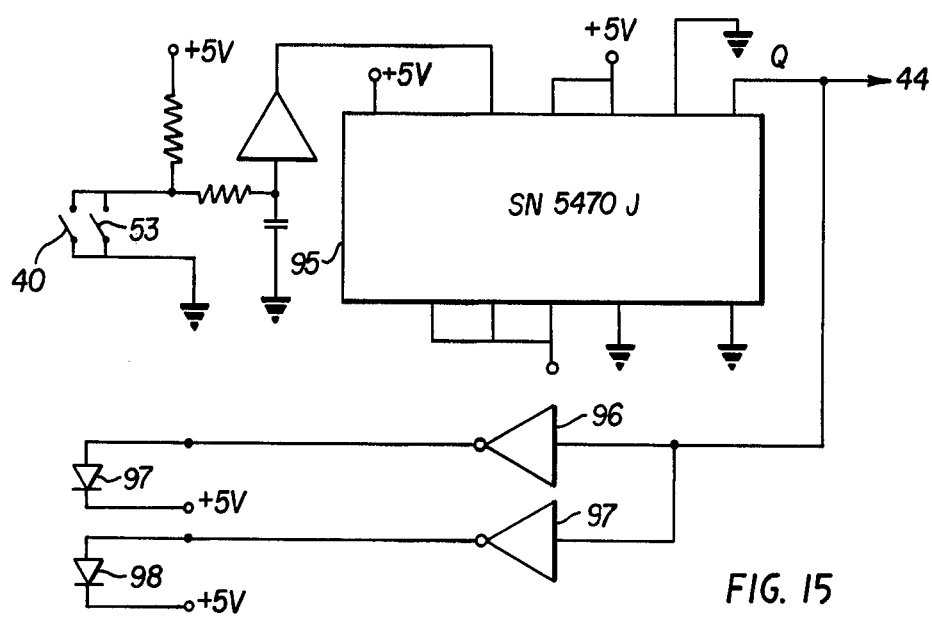
FIG. 15 is a schematic view of the manual command circuit for the rear ventilation shutters.

FIG. 15 shows a representation of the manual command circuit for the rear ventilation shutters 23, in which there are two electrical contacts, front and rear, closed by means of buttons 40 and 53 which are wired into the circuit so as to apply, when one of them is closed, a negative impulse to an input point of a flip-flop circuit 95, here of the TEXAS INSTRUMENTS type SN 5470 J, whose output point Q is connected to an input point on the microcalculator 44, following the arrow on the drawing, so as to bring about the opening of the corresponding shutters when it is activated in response to the closing of one of the contacts. The output power is also applied to the input positions of two invertor gates 96, 97, the output points of which are respectively connected to two electroluminescent diodes 98, 99 which are polarized so as to give off light when the output point Q of the flip-flop is activated.

Figure 16:
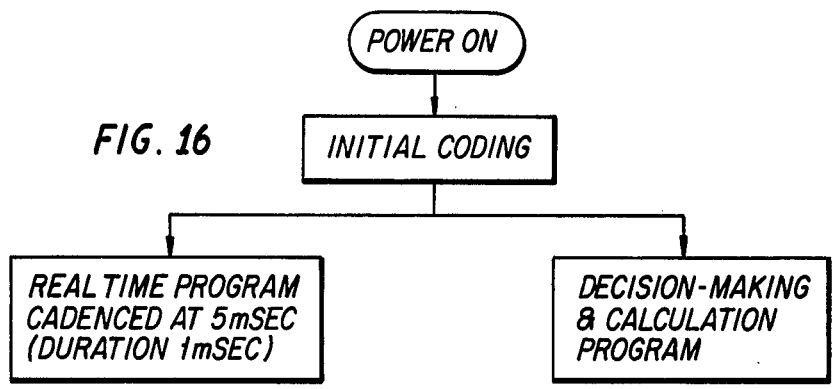
FIG. 16 is a general chart showing the organization of the programs assigned to the microcalculator.
Figure 17:
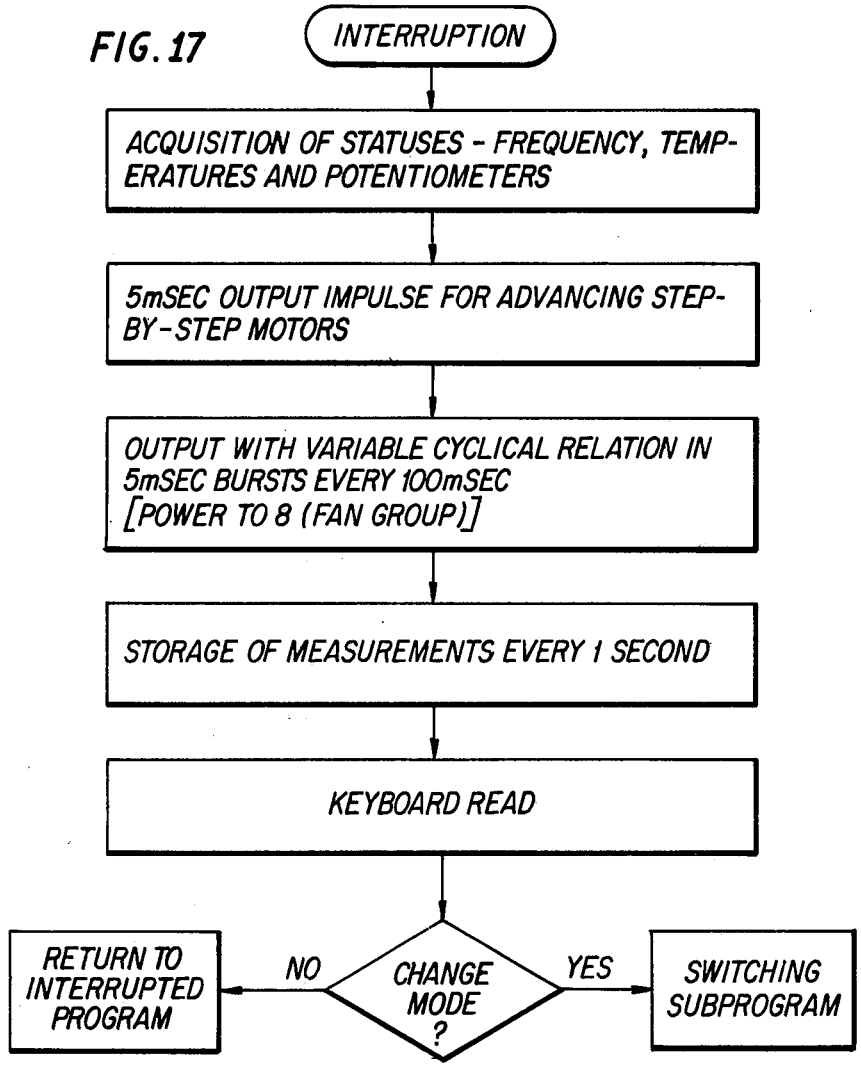
FIG. 17 is a chart showing the organization of the real time program of FIG. 16.
Figure 18:
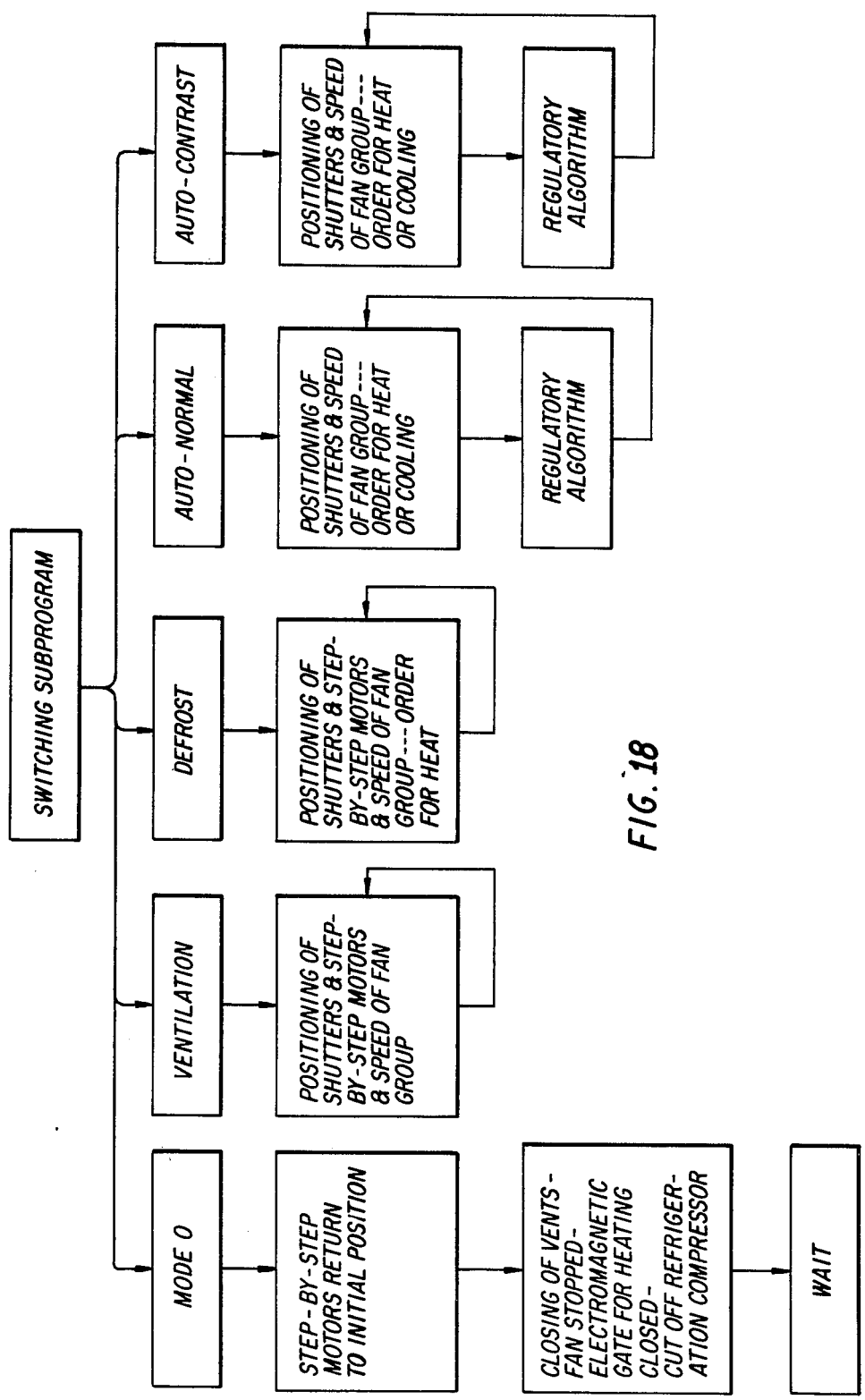
FIG. 18 is a chart showing the organization of a subprogram for switching from the so-called decision-making program and calculation program of FIG. 16.

An example of the chart showing the programming of the microcalculator is provided by FIGS. 16 to 18 in which FIG. 16 particularly shows the division of the programming into a real time program cadenced at 5 millisecond intervals, which lasts for about 1 millisecond, and a decision-making and calculation program which works during the time left free by the real time program.

This real time program is explained in FIG. 17 as being introduced by a cadenced five millisecond interruption and as consisting of:

the acquisition of the frequency values representative of the temperatures measured by the probes and the corrections desired introduced by the potentiometers as described earlier, it being noteworthy that storage of the frequency values measured is provided each second so that with a power-frequency converter able to operate at up to 100 Hertz, the microcalculator 44 is therefore able to detect in one second as many as 200 changes in logic statuses 0 and 1 by scrutiny of each power-frequency converter output signal every 5 milliseconds, the number of status changes detected being representative of the temperature value or correction considered;

the emitting of 5 millisecond impulses to the command output points for controlling the step-by-step motors for activating the variable position shutters (command impulses designated by I in FIG. 11);

the possible emitting of a 5 millisecond long impulse (in varying numbers over a 100 millisecond period) for the purpose of supplying with a series of electrical waves the fan group 8, thereby causing its speed to vary in the desired proportions (impulses in the present case applied to a commutation transistor 8a); and reading the keyboard of the control panel to answer the question: Should the mode be changed? If the answer is no, the program returns without interruption, and if the answer is yes, the subprogram for switching corresponding to FIG. 18 and which relates to the operating mode chosen is carried out.

The subprogram in FIG. 18 consists of the various operating modes which may be chosen by using buttons 35 to 39 from the keyboard on the control panel, giving rise to the following programming:

button 35 for mode 0 is a priority program which entails the initialization or resetting at zero of the step-by-step motors, the closing of all the shutters of the device, the interruption of the feed of power to the fan group and the closing of the electromagnetic gate for providing water to the radiator;

the ventilation button 38 is intended to implement a programming for determining the speed for the fan group (which may be changed every 5 milliseconds for a 100 millisecond period) and determining the positioning desired for the shutters;

the defrost button 39 is intended to implement, in the above manner, a program for determining the speed for the fan group and for determining the position desired for the shutters, with opening of the electromagnetic gate for supplying water to the radiator;

the buttons reading AUTO-NORMAL and AUTO-CONTRAST, respectively, are intended to implement a program for determining the positioning of the shutters and the speed of the fan group as a function of a regulatory algorithm which corresponds, using the same temperature control law recorded in the microcalculator but entailing a different setting of the position of the shutters depending on the measured outside temperature.

Figure 19:
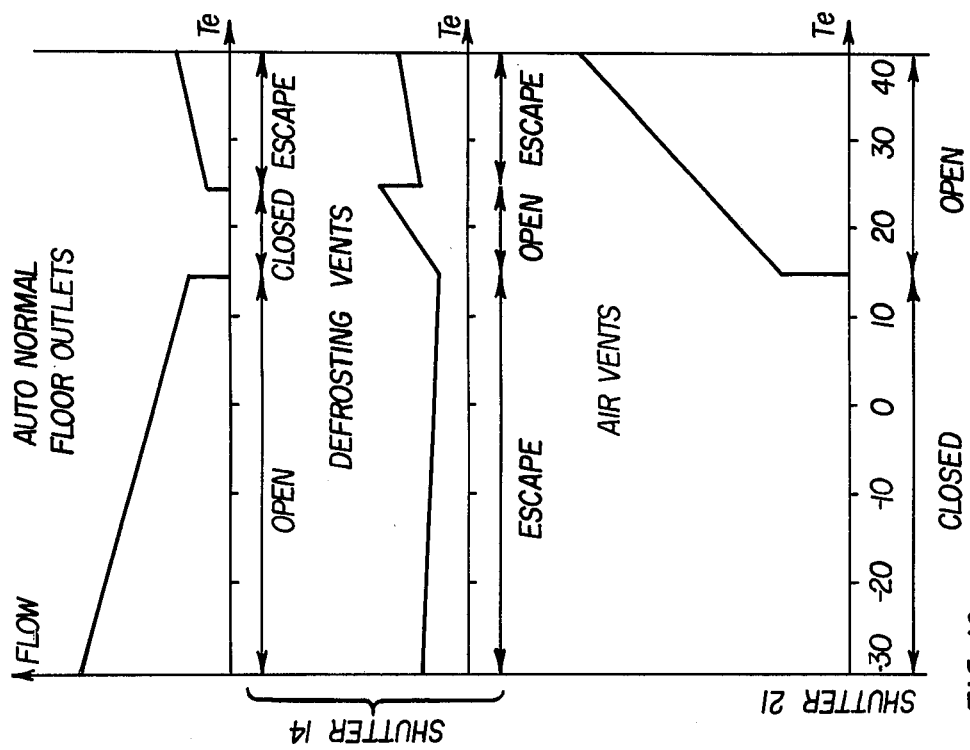
FIG. 19 is a diagram representing the status and flow of various air vents in the passenger compartment in the automatic climate control mode called AUTO-NORMAL.
Figure 20:
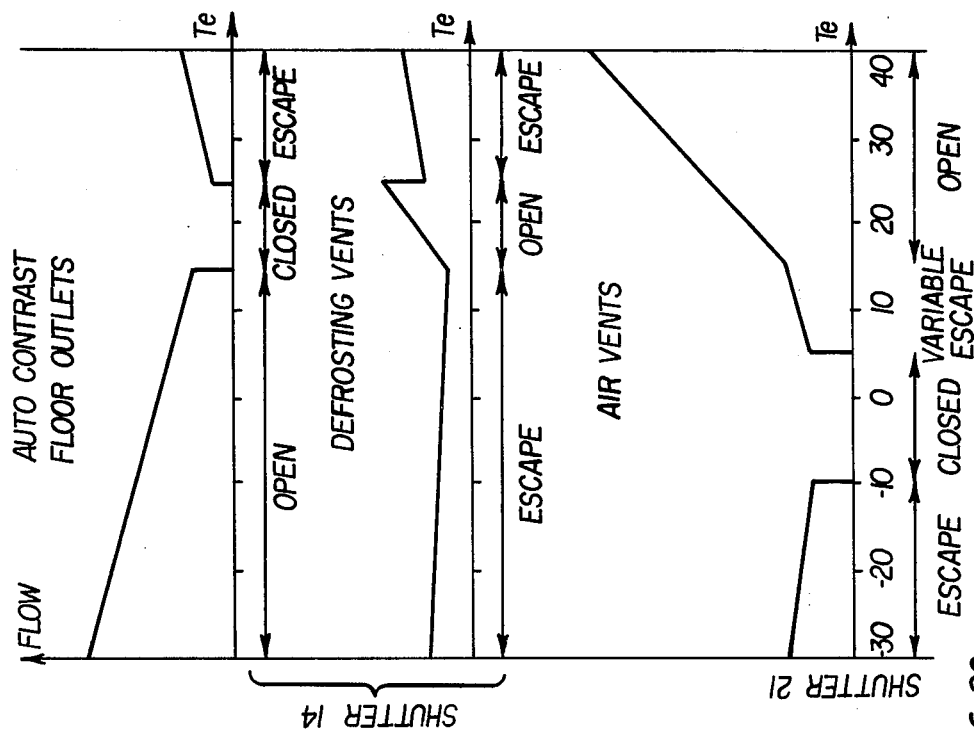
FIG. 20 is a diagram analogous to the preceding one and illustrating the automatic climate control mode called AUTO-CONTRAST.

FIGS. 19 and 20 are diagrams illustrating the status of and flows from the various air outlets in the passenger compartment, corresponding respectively to the programmed regulation in the AUTO-NORMAL mode and the AUTO-CONTRAST mode. This diagram shows on the abscissa the status OPEN-CLOSED or VENTING for the outlets under consideration, as a function of the outside temperature, and on the ordinate show the corresponding flows of air.

Figure 21:
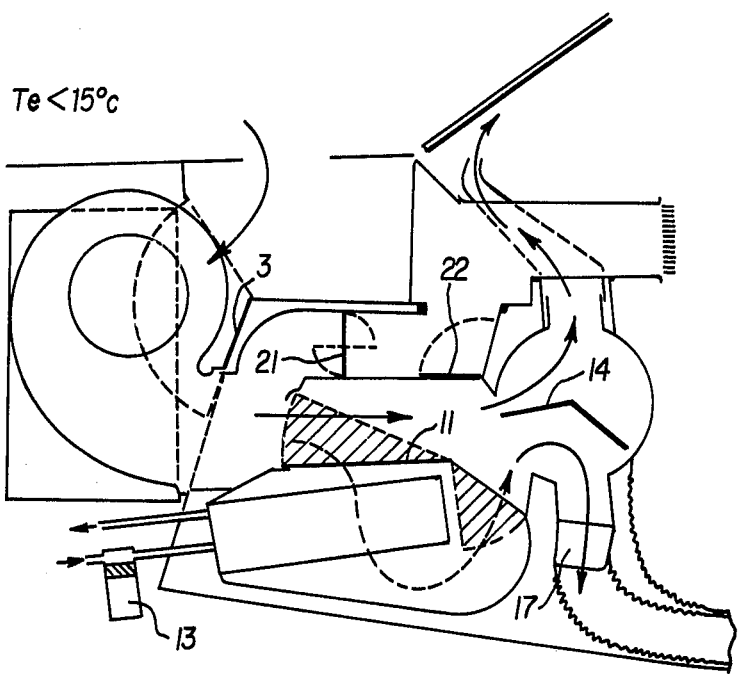
FIG. 21 is a sketch illustrating the position of the shutters of the device in the AUTO-NORMAL mode for outside temperatures below 15° C.
Figure 22:
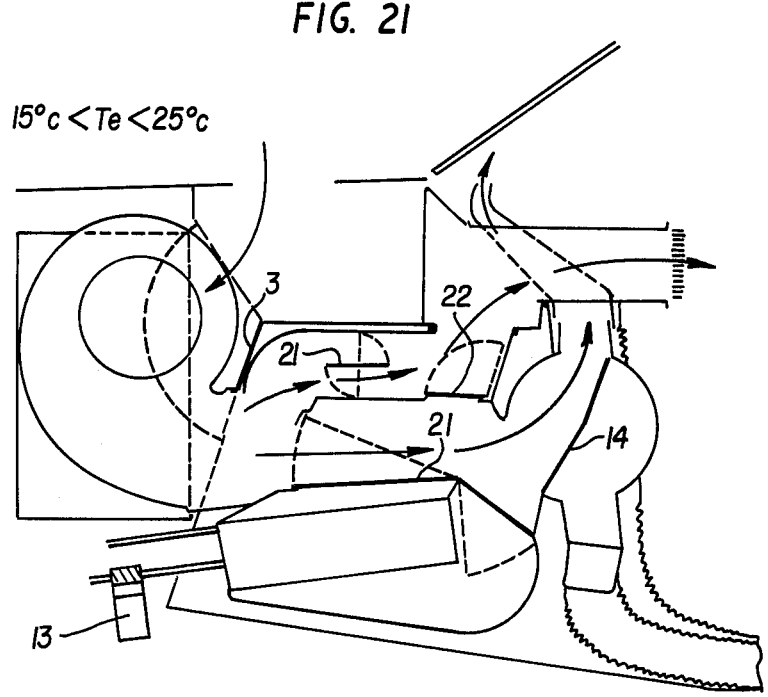
FIG. 22 is an illustrative sketch analogous to FIG. 21 for temperatures ranging from 15° C. to 25° C.
Figure 23:
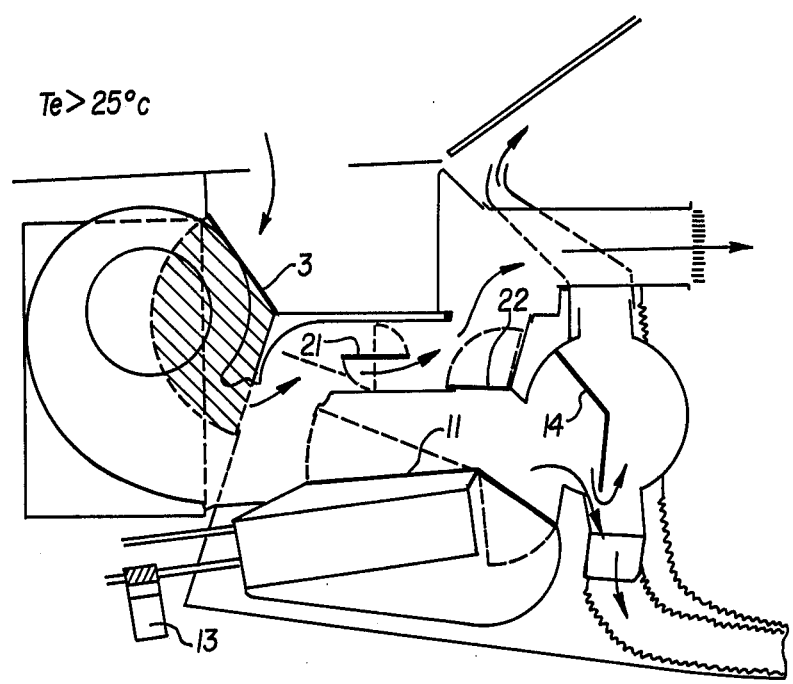
FIG. 23 is an illustrative sketch analogoud to FIG. 21 for temperature in excess of 25° C.
Figure 24:
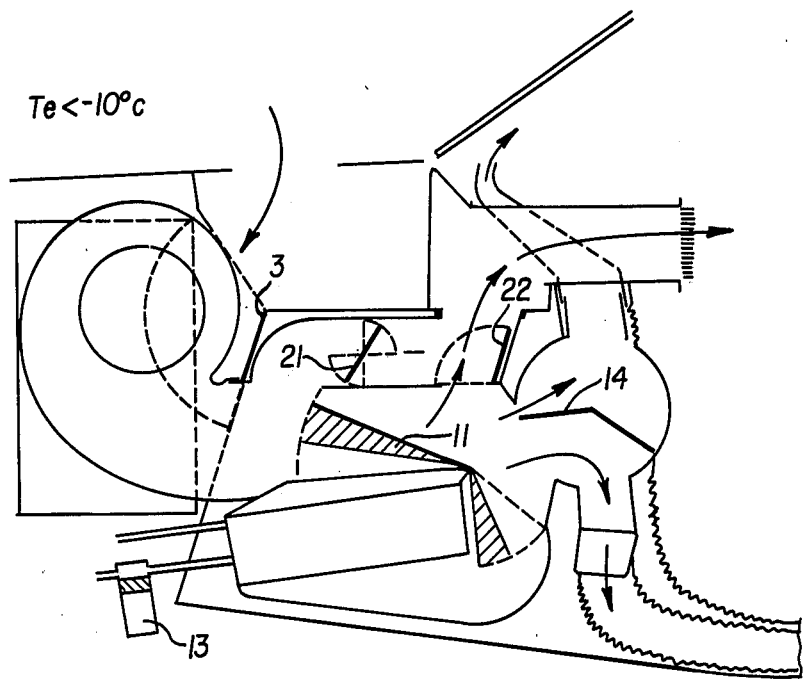
FIG. 24 is a sketch illustrating the position of the shutters of the device in the AUTO-CONTRAST mode for outside temperatures below −10° C.
Figure 25:
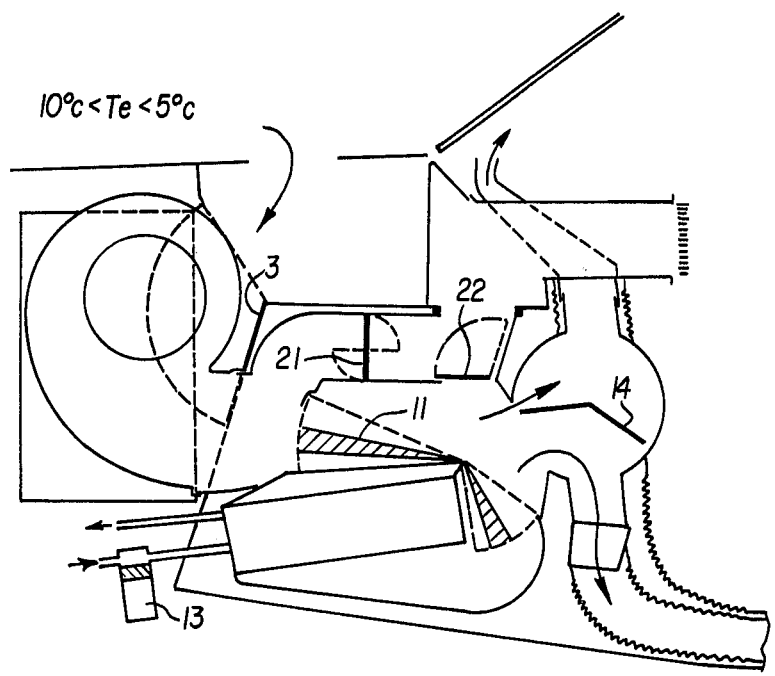
FIG. 25 is an illustrative sketch analogous to FIG. 24 for temperatures ranging from −10° C. to +5° C.
Figure 26:
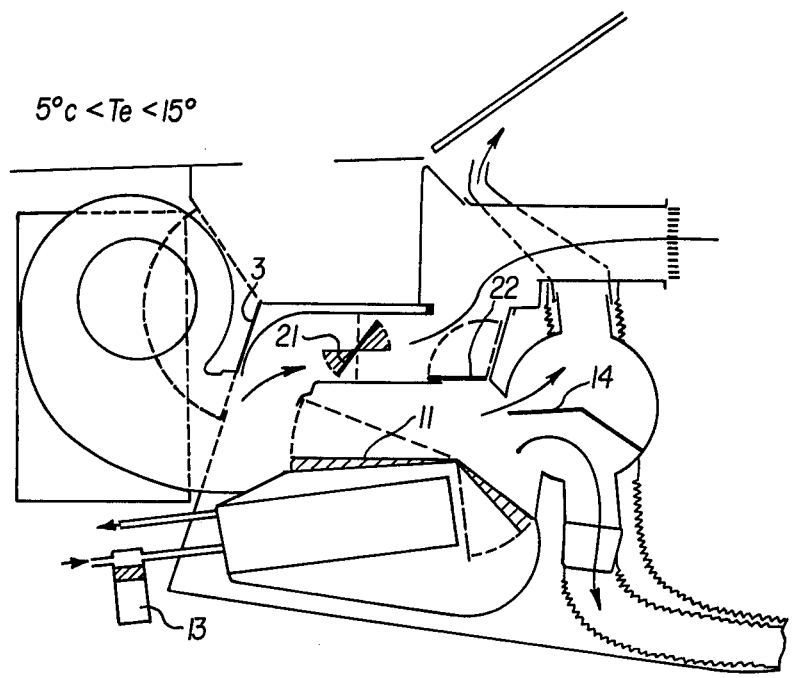
FIG. 26 is an illustrative sketch analogous to FIG. 24 for temperatures ranging from +5° C. to +15° C.
Figure 27:
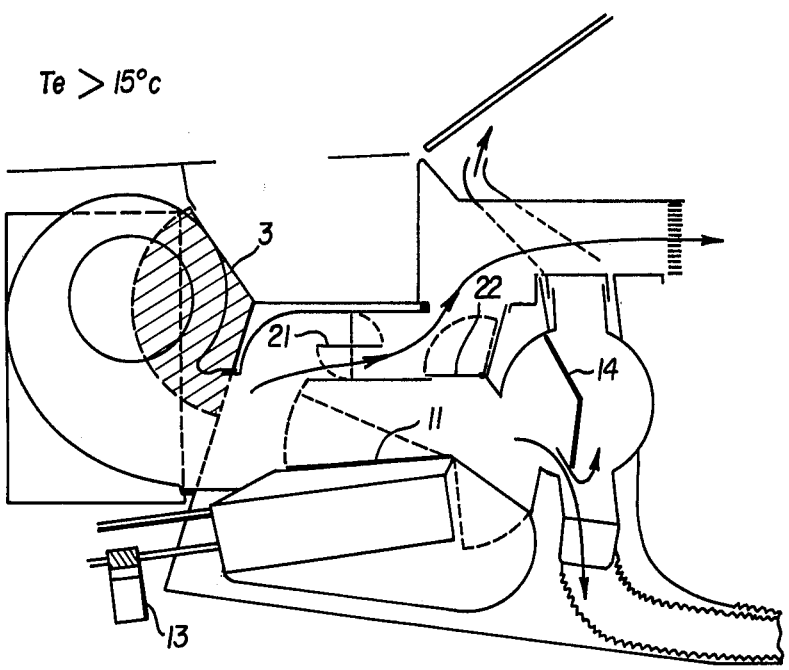
FIG. 27 is an illustrative sketch analogous to FIG. 24 for temperatures above 15° C.

In addition to this programmed regulation of air flows, FIGS. 21 to 23 on the one hand, and 24 to 27 on the other, respectively illustrate the programmed positioning of the other shutters of the device in the AUTO-NORMAL and AUTO-CONTRAST modes in accordance with the outside temperatures indicated in each figure, with the shaded areas between the positions of the variable shutters indicating the range of movement they have in the outside temperature range concerned, that of the recycling shutter corresponding to its passage to a recycling position for an outside temperature in excess of 35° C.

Figure 28:
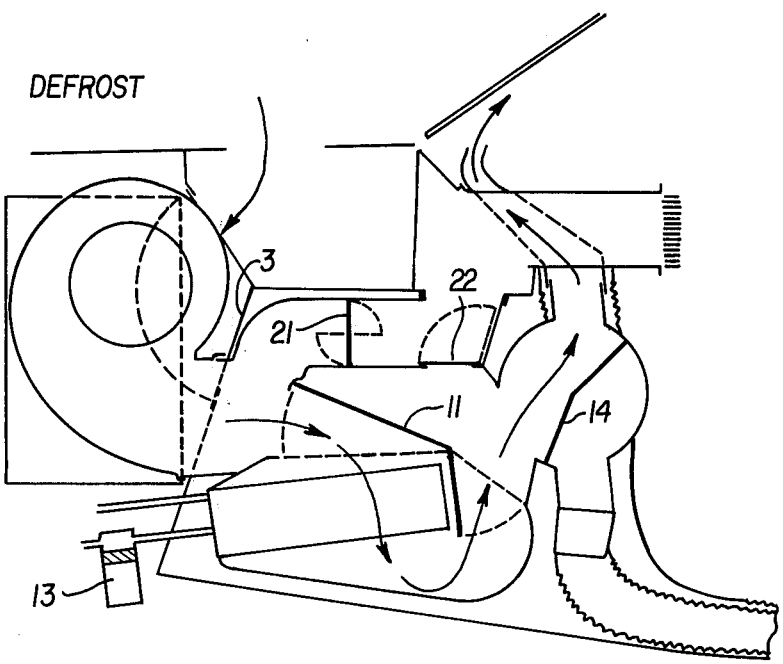
FIG. 28 is a sketch illustrating the position of the shutters of the device in the DEFROST mode.
Figure 29:
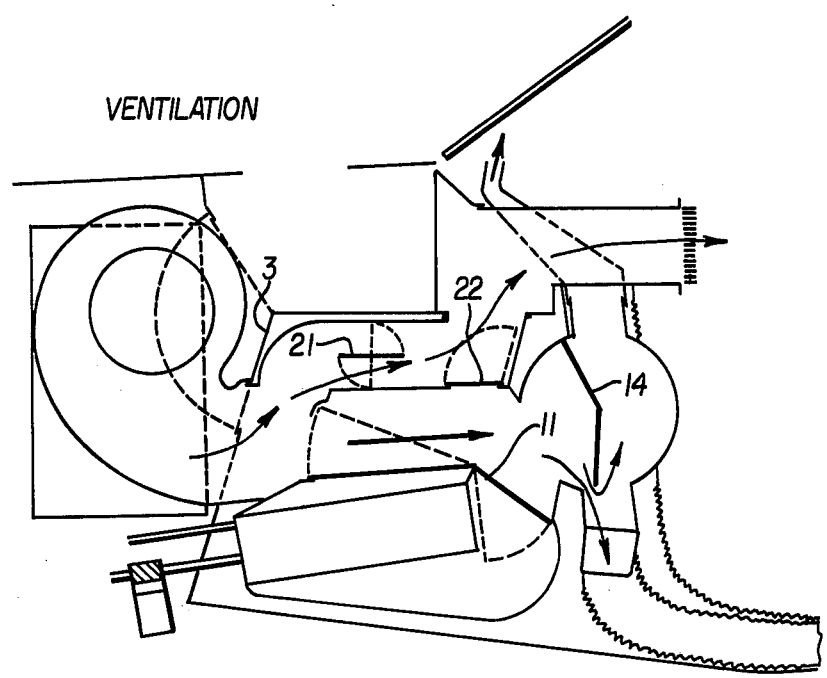
FIG. 29 is an illustrative sketch of the position of the shutters of the device in the VENTILATION mode.

FIGS. 28 and 29 illustrate in turn the programmed positioning of the shutters of the device in the DEFROST and VENTILATION modes, the laws for variation in the speed of fan group 8 in this case having been defined previously.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A climate control device for the passenger compartment of a motor vehicle including a heating radiator, comprising:
    fan means,
    an air distribution conduit disposed in the passenger compartment, an air mixing shutter positioned at an opening of the air distribution conduit which diverts a variable amount of the air flow from the fan means to the heating radiator,
    a defrosting conduit and a conduit with outlets at a floor portion of the passenger compartment,
    a distribution shutter placed between said defrosting conduit and said conduit with outlets at the floor portion of the passenger compartment,
    electronic probes for measuring the temperature inside and outside the passenger compartment,
    a microcalculator, connected to said electronic probes, which includes a memory containing a formula for the interior temperature required as well as a law for the flow from the fan means, both as a function of the outside temperature, the calculator being programmed for receiving temperature measurement data and processing such data so as to generate signals which depend upon the comparison between the required temperature law and the measured inside temperature and means for generating signals therefrom,
    a plurality of micromotors controlling the mixing and distribution shutters in response to signals generated from said means for generating signals, and
    means for controlling feed of the heating radiator and signals commanding the supply of electricity to the fan means in accordance with said flow law.

2. Climate control device for the passenger compartment of a motor vehicle according to claim 1, further comprising:
    an auxiliary conduit leading to inside air vents including a flow regulating shutter and a shutter for mixing with heated air from the distribution conduit, and
    means for controlling said micromotors for activating the shutters in the auxiliary circuit in accordance with output signals obtained by comparison between the inside ordered temperature formula and the measured temperature.

3. Device for the climate control of a motor vehicle passenger compartment according to claim 1, further comprising:
    means for correcting the interior temperature including a plurality of correcting potentiometers operatively connected with the outside temperature measurement probe to stimulate an artificial temperature reading.

4. Device for the climate control of a motor vehicle passenger compartment according to claim 1, said electronic probes comprising two electronic probes, high and low, for measuring the internal temperature, such that a determination of mean temperature (tm) is made in accordance with the formula $tm = \alpha t(h) + (1-\alpha) t(b)$ in which t(h) is the measured temperature at a high level, t(b) the measured temperature at a low level, and $\alpha$ is a coefficient which varies depending on whether the air is heated or not and chosen in such a way as to give more weight to the low-level probe in the event of heating.

5. Device for the climate control of a motor vehicle passenger compartment according to claim 1, further comprising:
    means for selecting an operating mode of demisting-/defrosting in response to which the means for generating signals serves to generate signals to supply the heating radiator with water, to position the mixing shutter of the distribution conduit for maximum heating, and to position the distribution valve in a position which closes the floor level conduit and
    means for correcting the maximum flow generated by the fan means.

6. Device for the climate control of a motor vehicle passenger compartment according to claim 2, further comprising:
    means for selecting an operating mode of ventilation in response to which the means for generating signals serves to generate signals to close water supply to the heating radiator, provide a medium flow from the fan means, open the shutter for regulating the flow from the auxiliary conduit, close the shutter for mixing air in the auxiliary conduit, and allowing escape of air toward the outlets at the floor portion and demisting; and
    means for manually correcting the average flow generated by the fan means.

7. Device for the climate control of a motor vehicle passenger compartment according to claim 1, further comprising:
    a refrigeration unit, positioned upstream from the fan means in said conduit for admitting air; and
    a conduit for admitting air which is connected to the distribution conduit and includes at its entrance a two-position shutter for recycling passenger compartment air or letting in outside air.

8. Device for the climate control of a motor vehicle passenger compartment according to claim 7, wherein:
    the means for generating a signal serves to generate an output signal for the refrigeration unit in response to a predetermined outside temperature threshhold measured by the relevant probe for operating thereof and, in response to a second temperature threshhold which is comparatively higher, a signal to position the two-position shutter in the recycling position.

9. Device for the climate control of a motor vehicle passenger compartment according to claims 2 or 7 or 8, the means for generating signals serves to generate signals to position the shutter regulating the flow from said auxiliary conduit leading to the interior vents in the open position.

10. Device for the climate control of a motor vehicle passenger compartment according to claim 2, further comprising:
    means for varying the position of the air mixing shutter in the distribution conduit.

11. Device for the climate control of a motor vehicle passenger compartment according to claim 2, further comprising:
    means for varying the position of the regulation shutter for the auxiliary conduit.

12. Device for the climate control of a motor vehicle passenger compartment according to claim 1, further comprising:
    an air distribution conduit with a mixing shutter and distribution shutter for each side of the vehicle and electronic probes for measuring the internal temperature on each side of the vehicle.

* * * * *